United States Patent
Yim et al.

(10) Patent No.: US 12,468,546 B2
(45) Date of Patent: Nov. 11, 2025

(54) SYSTEMS AND METHODS FOR PROTECTING INFORMATION HANDLING SYSTEM BOOT USING SMART NETWORK INTERFACE CONTROLLERS

(71) Applicant: Dell Products, L.P., Round Rock, TX (US)

(72) Inventors: Wai Chuen Yim, Merrimack, NH (US); Walter O'Brien, III, Westboro, MA (US)

(73) Assignee: Dell Products, L.P., Round Rock, TX (US)

( * ) Notice: Subject to any disclaimer, the term of this patent is extended or adjusted under 35 U.S.C. 154(b) by 0 days.

(21) Appl. No.: 18/050,643

(22) Filed: Oct. 28, 2022

(65) Prior Publication Data

US 2024/0143339 A1    May 2, 2024

(51) Int. Cl.
*G06F 9/4401* (2018.01)

(52) U.S. Cl.
CPC ............ *G06F 9/4408* (2013.01); *G06F 9/441* (2013.01); *G06F 9/4411* (2013.01)

(58) Field of Classification Search
CPC ...... G06F 9/4408; G06F 9/441; G06F 9/4411; G06F 11/1448; G06F 11/1461; G06F 11/1469

See application file for complete search history.

(56) References Cited

U.S. PATENT DOCUMENTS

| | | | |
|---|---|---|---|
| 7,650,531 B2 * | 1/2010 | Yeung | G06F 11/1458 714/2 |
| 2007/0032228 A1 * | 2/2007 | Varanda | G06F 11/0742 455/418 |
| 2010/0205421 A1 * | 8/2010 | Campbell | G06F 9/441 711/E12.001 |
| 2016/0162278 A1 * | 6/2016 | Kondik | G06F 9/4401 717/168 |
| 2019/0303173 A1 * | 10/2019 | Senda | H04N 1/00896 |
| 2020/0004647 A1 * | 1/2020 | Miyakawa | G06F 11/1471 |
| 2021/0389957 A1 * | 12/2021 | Aghaiepour | G06F 9/44505 |
| 2022/0100544 A1 * | 3/2022 | Voltz | G06F 9/45541 |

* cited by examiner

*Primary Examiner* — Hyun Soo Kim
(74) *Attorney, Agent, or Firm* — Fogarty LLP (57) ABSTRACT

A ransomware protection smart network interface controller (SmartNIC) is configured to create a secure snapshot of a boot device of an information handling system (IHS), create a secure alternate boot device on each boot of the IHS, and export the boot device and the secure alternate boot device to the IHS. The IHS is configured to set a boot order of the IHS, with the secure alternate boot device immediately after the boot device in the boot order. The ransomware protection SmartNIC may also be configured to create a read and writeable snapshot from the secure snapshot of the IHS boot device, and may delete, on each subsequent boot of the IHS, the read and writeable snapshot for the prior boot, and create a new read and writeable snapshot from a secure snapshot of the IHS boot device from the subsequent boot of the IHS.

20 Claims, 5 Drawing Sheets

SYSTEMS AND METHODS FOR PROTECTING INFORMATION HANDLING SYSTEM BOOT USING SMART NETWORK INTERFACE CONTROLLERS

CROSS-REFERENCE TO RELATED APPLICATIONS

This disclosure is related to U.S. Patent Application Serial Number entitled Ransomware Protection Systems and Methods Leveraging Smart Network Interface Controllers, U.S. Patent Application Serial Number entitled Systems and Methods for Protecting Information Handling Systems Using a Ransomware Protection Storage Device, and U.S. Patent Application Serial Number entitled Pave and/or Repave Systems and Methods Using Ransomware Protection Smart Network Interface Controller or Ransomware Protection Storage Device Secure Snapshots, all of which are filed concurrent herewith, on Oct. 28, 2022, and each of which are incorporated herein by reference.

FIELD

This disclosure relates generally to Information Handling Systems (IHSs), more specifically to protecting IHS boot using a Smart Network Interface Controller (SmartNIC), and particularly to protecting IHS boot using a ransomware protection SmartNIC.

BACKGROUND

As the value and use of information continues to increase, individuals and businesses seek additional ways to process and store information. One option available to users is Information Handling Systems (IHSs). An IHS generally processes, compiles, stores, and/or communicates information or data for business, personal, or other purposes thereby allowing users to take advantage of the value of the information. Because technology and information handling needs and requirements vary between different users or applications, IHSs may also vary regarding what information is handled, how the information is handled, how much information is processed, stored, or communicated, and how quickly and efficiently the information may be processed, stored, or communicated. The variations in IHSs allow for IHSs to be general or configured for a specific user or specific use such as financial transaction processing, airline reservations, enterprise data storage, or global communications. In addition, IHSs may include a variety of hardware and software components that may be configured to process, store, and communicate information and may include one or more computer systems, data storage systems, and networking systems.

Ransomware is an ever-evolving form of malware designed to encrypt files on a device, rendering any files and the systems that rely on them unusable and/or that threatens to publish the victim's data. Malicious actors then demand ransom in exchange for decryption. Ransomware is a type of malware from cryptovirology. While some simple ransomware may lock the system without damaging any files, more advanced malware uses a technique called cryptoviral extortion. It encrypts the victim's files, making them inaccessible, and demands a ransom payment to decrypt them. Recovering the files without the decryption key may be impossible, from a practical standpoint. Difficult to trace digital currencies such as paysafecard or cryptocurrency are typically demanded for payment of ransoms, making tracing and prosecuting the perpetrators difficult. Ransomware attacks are typically carried out using a Trojan file disguised as a legitimate file that the user is tricked into downloading or opening when it arrives as an email attachment. However, a worm may be used that travels automatically between computers without user interaction.

While there are many types of ransomware attacks, some focus on encrypting an IHS's boot device by either encrypting the entire device, critical portions of the device such as the master boot record, or the Unified Extensible Firmware Interface (UEFI) boot partition. Existing techniques for ransomware protection focus on protecting data. However, if the IHS boot path is compromised, time consuming manual intervention is required to restore the IHS to an operational state before application data can be restored.

SUMMARY

Embodiments of systems and methods for protecting Information Handling System (IHS) boot using Smart Network Interface Controllers (SmartNICs) are described. In an illustrative, non-limiting example, a ransomware protection SmartNIC is configured to create a secure snapshot of a boot device of an IHS, create a secure alternate boot device on each boot of the IHS, and export the boot device and the secure alternate boot device to the IHS. The IHS is configured to set a boot order of the IHS, with the secure alternate boot device immediately after the boot device in the boot order. Hence, the IHS may be configured to discover both the boot device and the secure alternate boot device, and/or the IHS may be configured to boot from the secure alternate boot device, in response to the IHS failing to boot from the boot device. The IHS may be an IHS server disposed in a server chassis and the ransomware protection SmartNIC may be disposed in the same, or another, server chassis, operatively coupled to the IHS server.

The ransomware protection SmartNIC may also be configured to create a read and writeable snapshot from the secure snapshot of the IHS boot device, and may delete, on each subsequent boot of the IHS, the read and writeable snapshot for the prior boot, and create a new read and writeable snapshot from a secure snapshot of the IHS boot device from the subsequent boot of the IHS.

The ransomware protection ransomware protection SmartNIC may include storage virtualization and mapping, and may create the secure snapshot of the boot device, using the ransomware protection ransomware protection SmartNIC storage virtualization and mapping, while the boot device is in a known good state. The ransomware protection SmartNIC may also be triggered, by a subsequent upgrade or update to the boot device, to create a new secure snapshot of the boot device.

BRIEF DESCRIPTION OF THE DRAWINGS

The present invention(s) is/are illustrated by way of example and is/are not limited by the accompanying figures, in which like references indicate similar elements. Elements in the figures are illustrated for simplicity and clarity and have not necessarily been drawn to scale.

DETAILED DESCRIPTION

For purposes of this disclosure, an Information Handling System (IHS) may include any instrumentality or aggregate of instrumentalities operable to compute, calculate, determine, classify, process, transmit, receive, retrieve, originate, switch, store, display, communicate, manifest, detect, record, reproduce, handle, or utilize any form of information, intelligence, or data for business, scientific, control, or other purposes. For example, an IHS may, in accordance with embodiments of the present systems and methods, be a server (e.g., compute sled, storage sled, blade server, etc.), an Enclosure Controller (EC) (e.g., an integrated modular server chassis remote access controller), a Graphics Processing Unit (GPU) card, a Data Processing Unit (DPU) card (e.g., a "smart" network interface controller (SmartNIC)), or any other suitable device and may vary in size, shape, performance, functionality, and price. The IHS may include random access memory (RAM), one or more processing resources such as a central processing unit (CPU) or hardware or software control logic, ROM, and/or other types of nonvolatile memory. Additional components of the IHS may include one or more disk drives, one or more network ports for communicating with external devices as well as various input and output (I/O) devices. The IHS may also include one or more buses operable to transmit communications between the various hardware components.

Embodiments of the present systems and methods are directed to protection of the operating environment of an IHS, such as, by at least in part, protecting IHS boot using a Smart Network Interface Controller (SmartNIC), and particularly to protecting IHS boot using a ransomware protection SmartNIC. As noted above SmartNICs are a type of DPU (card), or the like, such as may deployed in a IHS chassis, or the like, alongside one or more compute sleds, storage sleds, blade servers, etc.

Figure 1:
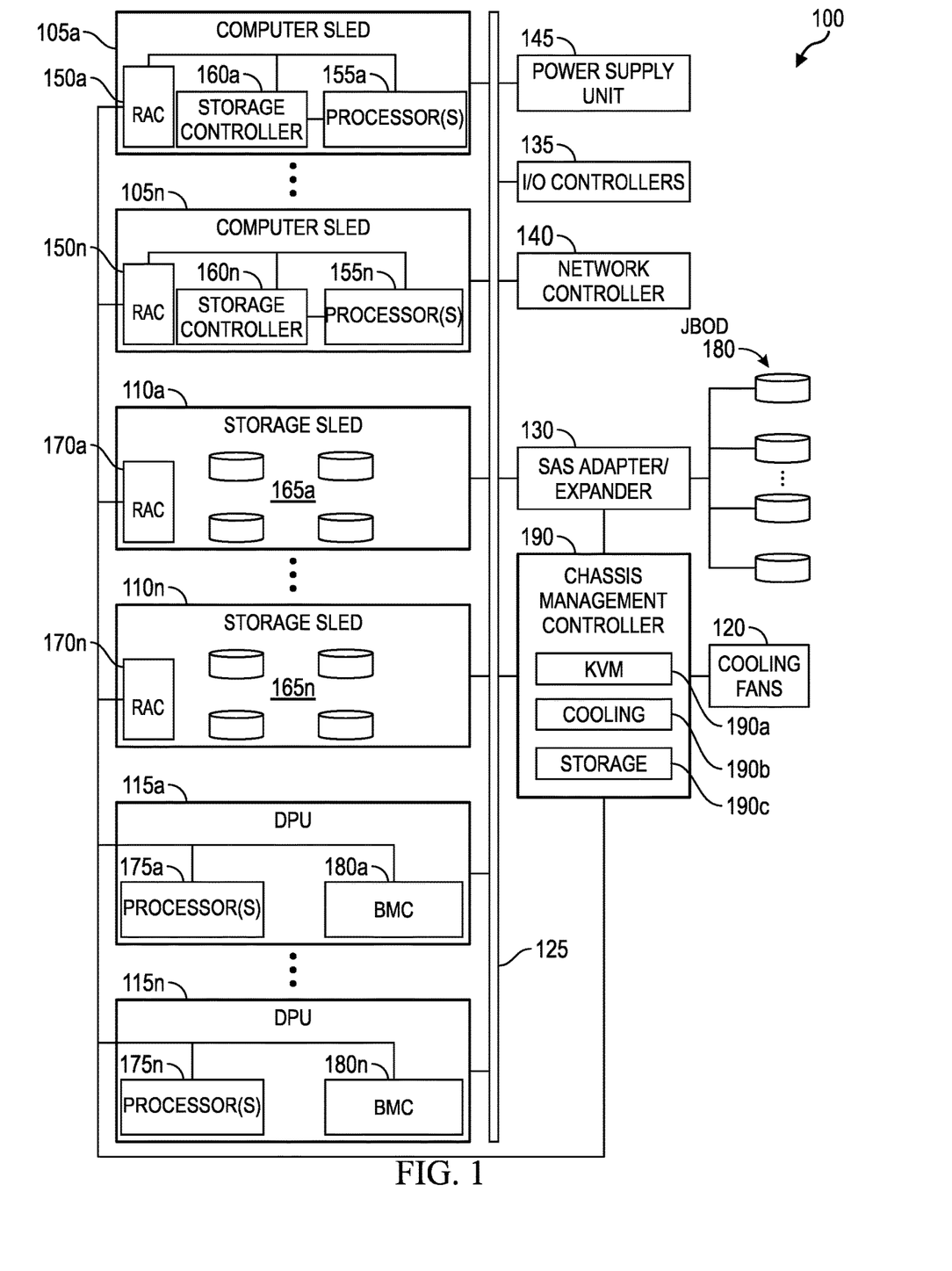
FIG. 1 is a diagram illustrating certain components of an example Information Handling Systems (IHS) chassis, wherein embodiments of the present systems and methods for protecting IHS boot with a (ransomware protection) Smart Network Interface Controller (SmartNIC) may be employed, according to some embodiments.

FIG. 1 is a block diagram illustrating certain components of an example IHS chassis 100 wherein embodiments of the present systems and methods for protecting IHS boot with a (ransomware protection) SmartNIC may be employed, according to some embodiments. Chassis 100 may have one or more compute sleds 105a-n, one or more storage sleds 110a-n and/or one or more DPUs 115a-115n, deployed therein. For example, chassis 100 may be a modular IHS chassis, such as, by way of example a Dell® PowerEdge™ MX7000 modular chassis. Embodiments of chassis 100 may include a wide variety of different hardware configurations. Such variations in hardware configuration may result from chassis 100 being factory assembled to include components specified by a customer that has contracted for manufacture and delivery of chassis 100, or such variations in hardware configuration may result from customer (directed) installation of various compute sleds, storage sleds, DPUs, or the like in chassis 100 (over time).

Chassis 100 may include one or more bays that each receive an individual sled (that may be additionally or alternatively referred to as a tray, blade, and/or node), DPU, or the like, such as compute sleds 105a-n, storage sleds 110a-n, DPUs 115a-n, etc. Chassis 100 may support a variety of different numbers (e.g., 4, 8, 16, 32), sizes (e.g., single-width, double-width) and physical configurations of bays. Other embodiments may include additional types of sleds or DPUs that provide various types of storage and/or processing capabilities. Other types of sleds or DPUs may provide power management and networking functions. Sleds or DPUs may be individually installed and removed from chassis 100, thus allowing the computing and storage capabilities of a chassis to be reconfigured by swapping the sleds or DPUs with different types of sleds without affecting the operations of the other sleds or DPUs installed in the chassis 100.

Multiple chassis 100 may be housed within a rack. Data centers may utilize large numbers of racks, with different types of chassis installed in the various configurations of racks. The modular architecture provided by the sleds, DPUs, chassis, and rack allow for certain resources, such as cooling, power and network bandwidth, to be shared by compute sleds 105a-n, storage sleds 110a-n, and DPUs 115a-n thus providing efficiency improvements and supporting greater computational loads.

Chassis 100 may be installed within a rack structure that provides all or part of the cooling utilized by chassis 100. For airflow cooling, a rack may include one or more banks of cooling fans that may be operated to ventilate heated air from within chassis 100 that is housed within the rack. Chassis 100 may alternatively or additionally include one or more cooling fans 120 that may be similarly operated to ventilate heated air from within sleds 105a-n, 110a-n, DPUs 115a-n, etc. installed within the chassis. Rack and chassis 100 installed within the rack may utilize various configurations and combinations of cooling fans to cool sleds 105a-n, 110a-n, DPUs 115a-n and other components housed within chassis 100.

Sleds 105a-n, 110a-n, DPUs 115a-n, etc. may be individually coupled to chassis 100 via connectors that correspond to the bays provided by chassis 100 and that physically and electrically couple an individual sled to backplane 125. Chassis backplane 125 may be a printed circuit board that includes electrical traces and connectors that are configured to route signals between the various components of chassis 100 that are connected to backplane 125.

Backplane 125 may include various additional components, such as cables, wires, midplanes, backplanes, connectors, expansion slots, and multiplexers. In certain implementations, backplane 125 may be a motherboard that includes various electronic components installed thereon. Such components installed on backplane 125 may include components that implement all or part of the operations described with regard to the Serial Attached SCSI (SAS) expander 130, I/O controllers 135, network controller 140 and power supply unit (PSU) 145.

Figure 2:
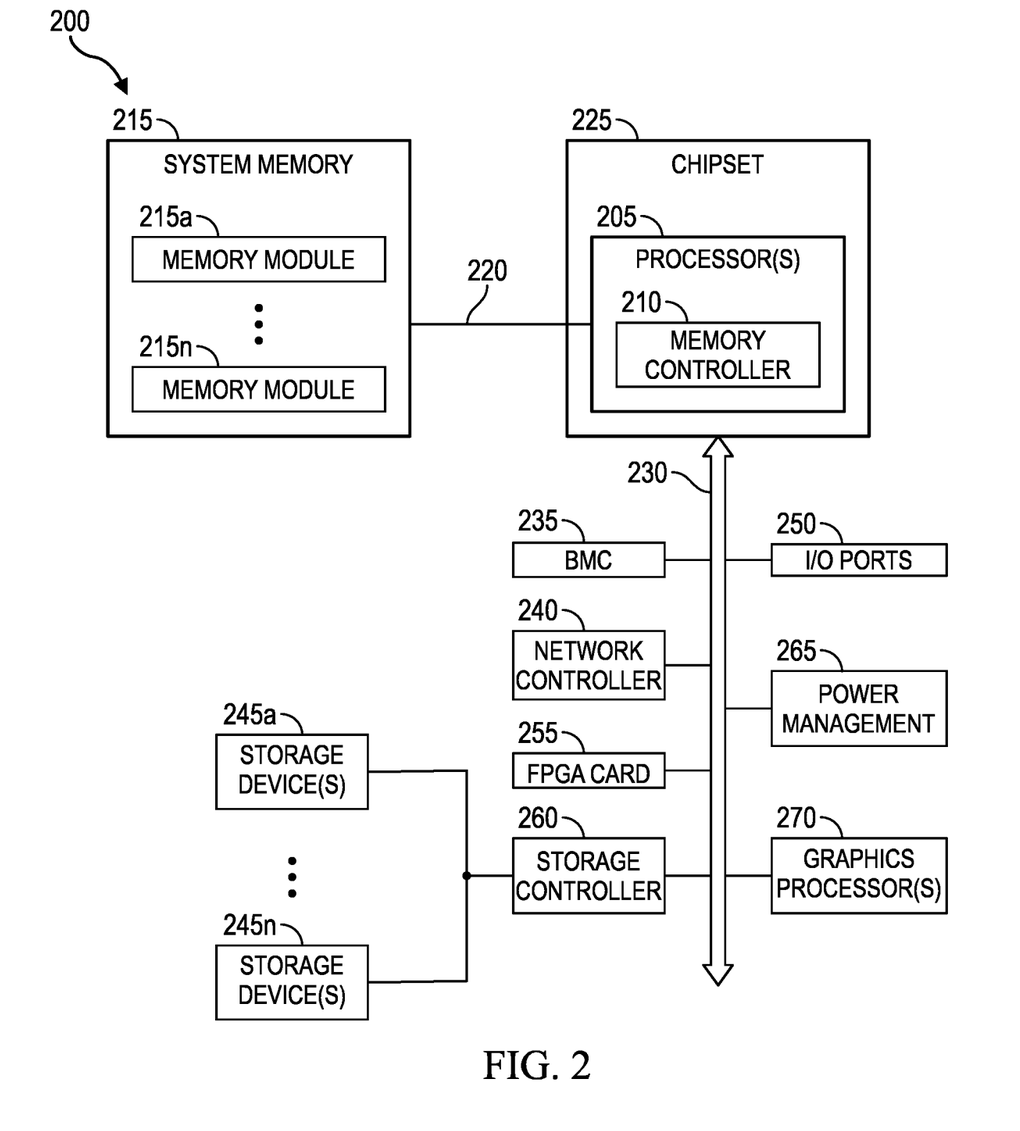
FIG. 2 is a block diagram illustrating components of an example of an IHS, with which embodiments of the present systems and methods for protecting IHS boot with a (ransomware protection) SmartNIC may be employed, according to some embodiments.

Each of compute sleds 105a-n may be an IHS such as described with regard to IHS 200 of FIG. 2. Each of compute sleds 105a-n may provide computational processing resources that may be used to support a variety of e-commerce, multimedia, business and scientific computing applications, such as services provided via a cloud implementation. Compute sleds 105a-n are typically configured with hardware and software that provide leading-edge computational capabilities. Accordingly, services provided using such computing capabilities are typically provided as high-availability systems that operate with minimum downtime. Compute sleds 105a-n may be configured for general-purpose computing or may be optimized for specific computing tasks.

As illustrated, each of compute sleds 105a-n may include a respective Remote Access Controller (RAC) 150a-n. Each of RACs 150a-n may be a BMC, or the like and provides capabilities for remote monitoring and management of a corresponding one of compute sleds 105a-n. In support of these monitoring and management operations, RACs 150a-n may utilize both in-band and sideband (i.e., out-of-band) communications with various components of compute sleds 105a-n and chassis 100. RACs 150a-n may collect various types of sensor data, such as collecting temperature sensor readings that are used in support of airflow cooling of the chassis 100 and the sleds 105a-n, 110a-n, DPUs 115a-n, etc. In addition, each of RACs 150a-n may implement various functions related to compute sleds 105a-n that utilize sideband bus connections with various internal components thereof. As a non-limiting example of a RAC, the integrated Dell RAC (iDRAC) from Dell® is embedded within Dell PowerEdge™ servers and provides functionality that helps information technology (IT) administrators deploy, update, monitor, and maintain servers remotely. Each of the compute sleds 105a-n may utilize one or more system processors 155a-n, that may be referred to as CPUs (central processing units) and that may be assigned computing tasks, such as via respective RAC 150a-n. In some embodiments, CPUs 155a-n may each include a plurality of processing cores that may be separately assigned computing tasks. Each of the compute sleds 105a-n may also include respective one of storage controllers 160a-n that may be utilized to access storage drives that are accessible via chassis 100. Some individual storage controllers 160a-n may provide support for Redundant Array of Independent Disks (RAID) configurations of logical and physical storage drives, such as storage drives provided by storage sleds 110a-n. Some or all individual storage controllers 160a-n may be Host Bus Adapters (HBAs) that provide more limited capabilities in accessing physical storage drives provided via storage sleds 110a-n and/or via SAS expander 130.

As illustrated, chassis 100 may also include one or more storage sleds 110a-n that are coupled to backplane 125 and installed within one or more bays of chassis 100 in a similar manner to compute sleds 105a-n. Each of individual storage sleds 110a-n may include different numbers and types of storage devices 165a-n. For instance, storage sleds 110a-n may include SAS magnetic disk drives, Serial Advanced Technology Attachment (SATA) magnetic disk drives, solid-state drives (SSDs), and other types of storage drives in various combinations. Storage sleds 110a-n may be utilized in various storage configurations by compute sleds 105a-n that are coupled to chassis 100. As illustrated, each storage sled 110a-n includes RAC 170a-n, which may also be BMCs, to provide capabilities for remote monitoring and management. Again, as a non-limiting example of a RAC, the integrated Dell RAC (iDRAC) from Dell® is embedded within Dell PowerEdge™ devices and provides functionality that helps information technology (IT) administrators deploy, update, monitor, and maintain devices remotely.

In some implementations, processing tasks may be allocated for processing to a specific processing unit, such as to DPUs 115a-n, which are supplementary processors that operate separate from the one or more main CPUs 155a-n of compute sleds 105a-n, or the like. Each of the DPUs 115a-n may include respective programmable processor 175a-n that can be configured for offloading functions from CPUs 155a-n. In some instances, DPUs 115a-n may be programmed to offload functions that support the operation of devices or systems that are coupled in chassis 100 thus sparing CPUs 155a-n from a significant number of interrupts required to support these devices and gaining efficiency through the use of specialized implementations of these offloaded functions that can be achieved using the programmable logic of the DPUs 155a-n. In some embodiments, DPU processors 175a-n may each include a plurality of programmable processing cores and/or hardware accelerators, that may be used to implement functions used to support devices in chassis. In some embodiments, the processing cores of DPU processor 175a-n may include ARM (advanced RISC (reduced instruction set computing) machine) processing cores. In other embodiments, the cores of DPU processor 175a-n may include MIPS (microprocessor without interlocked pipeline stages) cores, RISC-V cores, or CISC (complex instruction set computing) (i.e., x86) cores. Each core of the DPU processor 175a-n may be programmed to perform separate functions that support operation of chassis devices. In some embodiments, DPUs 115a-n may be implemented through integrated circuits mounted on a printed circuit board (e.g., a replaceable card) that is coupled to backplane 125, or the like. In various embodiments, DPUs 115a-n may manage high-bandwidth connections with networking devices in implementing functions of a network switch, compression and codec functions, virtualization operations or cryptographic functions. As shown, each of DPUs 115a-n may also include a respective BMC 180a-n to provide capabilities for (remote) monitoring and management of various aspects of the DPU. In support of these operations, BMCs 180a-n may utilize both in-band, sideband and/or out of band communications with certain managed components of respective DPU, such as, for example, processor(s) 175a-n. BMCs 180a-n may each include non-volatile memory having program instructions stored thereon that are usable by CPUs 175a-n to enable (remote) management of the respective DPU.

In addition to the data storage capabilities provided by storage sleds 110a-n, chassis 100 may provide access to other storage resources that may be installed components of chassis 100 and/or may be installed elsewhere within a rack housing the chassis 100, such as within a storage blade. In certain scenarios, such storage resources 185 may be accessed via SAS expander 130 coupled to the backplane 125. SAS expander 130 may support connections to a number of Just a Bunch Of Disks (JBOD) storage drives 185 that may be configured and managed individually and without implementing data redundancy across drives 185. Additional storage resources 185 may also be at various other locations within a datacenter in which chassis 100 is installed. Such additional storage resources 185 may also be remotely located.

As illustrated, chassis 100 of FIG. 1 may include a network controller 140 that provides network access to the sleds 105a-n, 110a-n, DPUs 115a-n, etc. installed within the chassis. Network controller 140 may include various switches, adapters, controllers and couplings used to connect chassis 100 to a network, either directly or via additional networking components and connections provided via a rack in which chassis 100 is installed.

Chassis 100 may similarly include PSU 145 that provides the components of the chassis with various levels of DC power from an AC power source or from power delivered via a power system provided by a rack within which chassis 100 may be installed. In certain embodiments, PSU 145 may be implemented within a sled that may provide chassis 100 with redundant, hot-swappable PSUs.

Chassis 100 may also include various I/O controllers 135 that may support various I/O ports, such as USB ports that may be used to support keyboard and mouse inputs and/or video display capabilities. Such I/O controllers 135 may be utilized by chassis management controller (CMC) 190, which may variously be referred to herein as a "chassis integrated remote access controller," or the like, to support various KVM (Keyboard, Video and Mouse) 190a capabilities that provide administrators with the ability to interface with the chassis 100. To wit, CMC 125 may provide a system management console via KVM 190a to enable such capabilities that provide administrators with the ability to interface with the chassis 100. One example of such a system management console is the Dell® OpenManage Enterprise (OME) systems management console. In some embodiments, a system management console may be deployed on a secure virtual machine (VM), such as a VMWARE Workstation appliance. CMC 190 may also include storage module 190c that provides capabilities for managing and configuring certain aspects of the storage devices of chassis 100, such as the storage devices provided within storage sleds 110a-n and within JBOD 185, as well as other aspects of chassis devices such as compute sleds 105a-n, DPUs 115a-n, etc., and other components of chassis 100. In addition to providing support for KVM 190a capabilities for administering chassis 100, CMC 190 may support various additional functions for sharing the infrastructure resources of chassis 100. In some scenarios, CMC 190 may implement tools for managing power 145, network bandwidth 140, and airflow cooling 120 available via chassis 100. For example, airflow cooling 120 may be provided by a rack in which chassis 100 may be installed and managed by cooling module 190b of CMC 190.

FIG. 2 shows an example of an IHS 200, with which embodiments of the present systems and methods for protecting IHS boot with a (ransomware protection) SmartNIC may be employed, according to some embodiments. It should be appreciated that although the embodiments described herein may describe an IHS that is a compute sled, storage sled, DPU (e.g., a SmartNIC), or similar computing component that may be deployed within the bays of a chassis (100), other embodiments may be utilized with other types of IHSs that may also support ransomware protection, including IHS boot protection in accordance with embodiments of the present systems and methods, leveraging SmartNICs. In the example of FIG. 2, IHS 200 may be a computing component, such as compute sled 105a-n or other type of server, such as an 1RU server installed within a 2RU chassis, that is configured to share infrastructure resources provided by chassis 100. In other examples, storage sleds 110a-n, DPUs 115a-n, and/or the like, may each include a number of the components described as a part of IHS 200.

Thus, IHS 200 of FIG. 2 may be a compute sled, storage sled, DPU, or similar computing component, such as compute sleds 105a-n, storage sleds 110a-n and/or DPUs 115a-n of FIG. 1, that may be installed within a chassis (100), that may in turn be installed within a rack. Installed in this manner, IHS 200 may utilize shared power, network and cooling resources provided by the chassis and/or rack. Embodiments of IHS 200 may include a wide variety of different hardware configurations.

However, IHS 200 may utilize one or more processors 205. In some embodiments, processors 205 may include a main processor and a co-processor, each of which may include a plurality of processing cores that, in certain scenarios, may each be used to run an instance of a server process. In certain embodiments, one or all of processor(s) 205 may be graphics processing units (GPUs) in scenarios where IHS 200 has been configured to support functions such as multimedia services and graphics applications.

As illustrated, processor(s) 205 includes an integrated memory controller 210 that may be implemented directly within the circuitry of the processor 205, or the memory controller 210 may be a separate integrated circuit that is located on the same die as the processor 205. The memory controller 210 may be configured to manage the transfer of data to and from the system memory 215 of the IHS 205 via a high-speed memory interface 220. The system memory 215 is coupled to processor(s) 205 via a memory bus 220 that provides the processor(s) 205 with high-speed memory used in the execution of computer program instructions by the processor(s) 205. Accordingly, system memory 215 may include memory components, such as static RAM (SRAM), dynamic RAM (DRAM), NAND Flash memory, suitable for supporting high-speed memory operations by the processor(s) 205. In certain embodiments, system memory 215 may combine both persistent, non-volatile memory and volatile memory.

In certain embodiments, the system memory 215 may be comprised of multiple removable memory modules. The system memory 215 of the illustrated embodiment includes removable memory modules 215a-n. Each of the removable memory modules 215a-n may correspond to a printed circuit board memory socket that receives a removable memory module 215a-n, such as a DIMM (Dual In-line Memory Module), that can be coupled to the socket and then decoupled from the socket as needed, such as to upgrade memory capabilities or to replace faulty memory modules. Other embodiments of IHS memory 215 may be configured with memory socket interfaces that correspond to different types of removable memory module form factors, such as a Dual In-line Package (DIP) memory, a Single In-line Pin Package (SIPP) memory, a Single In-line Memory Module (SIMM), and/or a Ball Grid Array (BGA) memory.

IHS 200 may utilize chipset 225 that may be implemented by integrated circuits that are coupled to processor(s) 205. In this embodiment, processor(s) 205 is depicted as a component of chipset 225. In other embodiments, all of chipset 225, or portions of chipset 225 may be implemented directly within the integrated circuitry of processor(s) 205. The chipset may provide the processor(s) 205 with access to a variety of resources accessible via one or more buses 230. Various embodiments may utilize any number of buses to provide the illustrated pathways served by bus 230. In certain embodiments, bus 230 may include a PCIe switch fabric that is accessed via a PCIe root complex.

As illustrated, IHS 200 includes BMC 235 to provide capabilities for remote monitoring and management of various aspects of IHS 200. In support of these operations, BMC 235 may utilize both in-band, sideband and/or out of band communications with certain managed components of IHS 200, such as, for example, processor(s) 205, system memory 215, chipset 225, network controller 240, storage device(s) 245, etc. BMC 235 may be installed on the motherboard of IHS 200 or may be coupled to IHS 200 via an expansion slot provided by the motherboard. As a non-limiting example of a BMC, the integrated Dell Remote Access Controller (iDRAC) from Dell® is embedded within Dell Power- Edge™ servers and provides functionality that helps information technology (IT) administrators deploy, update, monitor, and maintain servers remotely. BMC 235 may include non-volatile memory having program instructions stored thereon that are usable by CPU(s) 205 to enable remote management of IHS 200. For example, BMC 235 may enable a user to discover, configure, and manage BMC 235, setup configuration options, resolve and administer hardware or software problems, etc. Additionally, or alternatively, BMC 235 may include one or more firmware volumes, each volume having one or more firmware files used by the BIOS' firmware interface to initialize and test components of IHS 200.

IHS 200 may also include the one or more I/O ports 250, such as USB ports, PCIe ports, TPM (Trusted Platform Module) connection ports, HDMI ports, audio ports, docking ports, network ports, Fibre Channel ports and other storage device ports. Such I/O ports 250 may be externally accessible or may be internal ports that are accessed by opening the enclosure of the IHS 200. Through couplings made to these I/O ports 250, users may couple the IHS 200 directly to other IHSs, storage resources, external networks and a vast variety of peripheral components, such as including in accordance with embodiments of the present systems and methods, a SmartNIC.

As illustrated, IHS 200 may include one or more FPGA (Field-Programmable Gate Array) cards 255. Each of the FPGA card 255 supported by IHS 200 may include various processing and memory resources, in addition to an FPGA logic unit that may include circuits that can be reconfigured after deployment of IHS 200 through programming functions supported by the FPGA card 255. Through such reprogramming of such logic units, each individual FGPA card 255 may be optimized to perform specific processing tasks, such as specific signal processing, security, data mining, and Artificial Intelligence (AI) functions, and/or to support specific hardware coupled to IHS 200. In some embodiments, a single FPGA card 255 may include multiple FPGA logic units, each of which may be separately programmed to implement different computing operations, such as in computing different operations that are being offloaded from processor 205.

IHS 200 may include one or more storage controllers 260 that may be utilized to access storage devices 245a-n that are accessible via the chassis in which IHS 200 is installed. Storage controller 260 may provide support for RAID configurations of logical and physical storage devices 245a-n. In some embodiments, storage controller 260 may be an HBA (Host Bus Adapter) that provides more limited capabilities in accessing physical storage devices 245a-n. In some embodiments, storage devices 245a-n may be replaceable, hot-swappable storage devices that are installed within bays provided by the chassis in which IHS 200 is installed. In embodiments where storage devices 245a-n are hot-swappable devices that are received by bays of chassis, the storage devices 245a-n may be coupled to IHS 200 via couplings between the bays of the chassis and a midplane of IHS 200. In some embodiments, storage devices 245a-n may also be accessed by other IHSs that are also installed within the same chassis as IHS 200. Storage devices 245a-n may include SAS (Serial Attached SCSI) magnetic disk drives, SATA (Serial Advanced Technology Attachment) magnetic disk drives, solid-state drives (SSDs) and other types of storage devices in various combinations.

Processor(s) 205 may also be coupled to a network controller 240 via bus 230, such as provided by a Network Interface Controller (NIC) that allows the IHS 200 to communicate via an external network, such as the Internet or a LAN. In some embodiments, network controller 240 may be a replaceable expansion card or adapter that is coupled to a motherboard connector of IHS 200. In some embodiments, network controller 240 may be an integrated component of IHS 200. However, in accordance with embodiments of the present systems and methods, a SmartNIC DPU may, as noted, be deployed in the same chassis (100) as IHS 200, or in another chassis, rack, or the like. Such a SmartNIC, is a programmable accelerator that makes data center networking, security and storage efficient and flexible and may offload from server CPU(s) (205) tasks related to networking, data movement, data storage, communication, etc.

A variety of additional components may be coupled to processor(s) 205 via bus 230. For instance, processor(s) 205 may also be coupled to power management unit 265 that may interface with power system unit 145 of chassis 100 in which IHS 200 is installed. In certain implementations, graphics processor 270 may be comprised within one or more video or graphics cards, or an embedded controller, installed as components of the IHS 200. In certain embodiments, a graphics processor 270 may be comprised within one or more video or graphics cards, or an embedded controller, installed as components of the IHS 200.

In certain embodiments, IHS 200 may operate using a BIOS (Basic Input/Output System) that may be stored in a non-volatile memory accessible by the processor(s) 205. The BIOS may provide an abstraction layer by which the operating system (OS) of the IHS 200 interfaces with the hardware components of the IHS. Upon powering or restarting IHS 200, processor(s) 205 may utilize BIOS instructions to initialize and test hardware components coupled to the IHS, including both components permanently installed as components of the motherboard of IHS 200 and removable components installed within various expansion slots supported by the IHS 200. The BIOS instructions may also load an OS for use by the IHS 200. In certain embodiments, IHS 200 may utilize Unified Extensible Firmware Interface (UEFI) in addition to or instead of a BIOS. In certain embodiments, the functions provided by a BIOS may be implemented, in full or in part, by the remote access controller 235. In some embodiments, BIOS may be configured to identify hardware components that are detected as being currently installed in IHS 200. In such instances, the BIOS may support queries that provide the described unique identifiers that have been associated with each of these detected hardware components by their respective manufacturers. In providing an abstraction layer by which hardware of IHS 200 is accessed by an OS, BIOS may identify the I/O ports 250 that are recognized and available for use.

In some embodiments, IHS 200 may include a TPM (Trusted Platform Module) that may include various registers, such as platform configuration registers, and a secure storage, such as an NVRAM (Non-Volatile Random-Access Memory). The TPM may also include a cryptographic processor that supports various cryptographic capabilities. In IHS embodiments that include a TPM, a pre-boot process implemented by the TPM may utilize its cryptographic capabilities to calculate hash values that are based on software and/or firmware instructions utilized by certain core components of IHS, such as the BIOS and boot loader of IHS 200. These calculated hash values may then be compared against reference hash values that were previously stored in a secure non-volatile memory of the IHS, such as during factory provisioning of IHS 200. In this manner, a TPM may establish a root of trust that includes core components of IHS 200 that are validated as operating using instructions that originate from a trusted source.

In various embodiments, an IHS 200 does not include each of the components shown in FIG. 2. In various embodiments, an IHS 200 may include various additional components in addition to those that are shown in FIG. 2. Furthermore, some components that are represented as separate components in FIG. 2 may in certain embodiments instead be integrated with other components. For example, in certain embodiments, all or a portion of the functionality provided by the illustrated components may instead be provided by components integrated into the one or more processor(s) 205 as a systems-on-a-chip.

A person of ordinary skill in the art will appreciate that IHS 200 is merely illustrative and is not intended to limit the scope of the disclosure described herein. In particular, any computer system and/or device may include any combination of hardware or software capable of performing certain operations described herein. In addition, the operations performed by the illustrated components may, in some embodiments, be performed by fewer components or distributed across additional components. Similarly, in other embodiments, the operations of some of the illustrated components may not be performed and/or other additional operations may be available.

A person of ordinary skill will recognize that IHS 200 of FIG. 2 is only one example of a system in which the certain embodiments may be utilized. Indeed, the embodiments described herein may be used in various electronic devices, such as network router devices, televisions, custom telecommunications equipment for special purpose use, etc. That is, certain techniques described herein are in no way limited to use with IHS 200 of FIG. 2.

As noted above, some ransomware attacks focus on encrypting an IHS's boot device by encrypting the entire device, critical portions of the device such as the master boot record, the Unified Extensible Firmware Interface (UEFI) boot partition, or the like. If the IHS boot path is thusly compromised, time consuming manual intervention is typically required to restore the IHS to an operational state before the application data can be restored. Embodiments of the present systems and methods protect the IHS operating environment, through systems and methods for leveraging a SmartNIC, such as a ransomware protection SmartNIC, to protect IHS boot. That is, embodiments of the present systems and methods use a ransomware protection SmartNIC, such as ransomware protection SmartNIC 300 of FIG. 3, as a platform, and add boot device protection.

Figure 3:
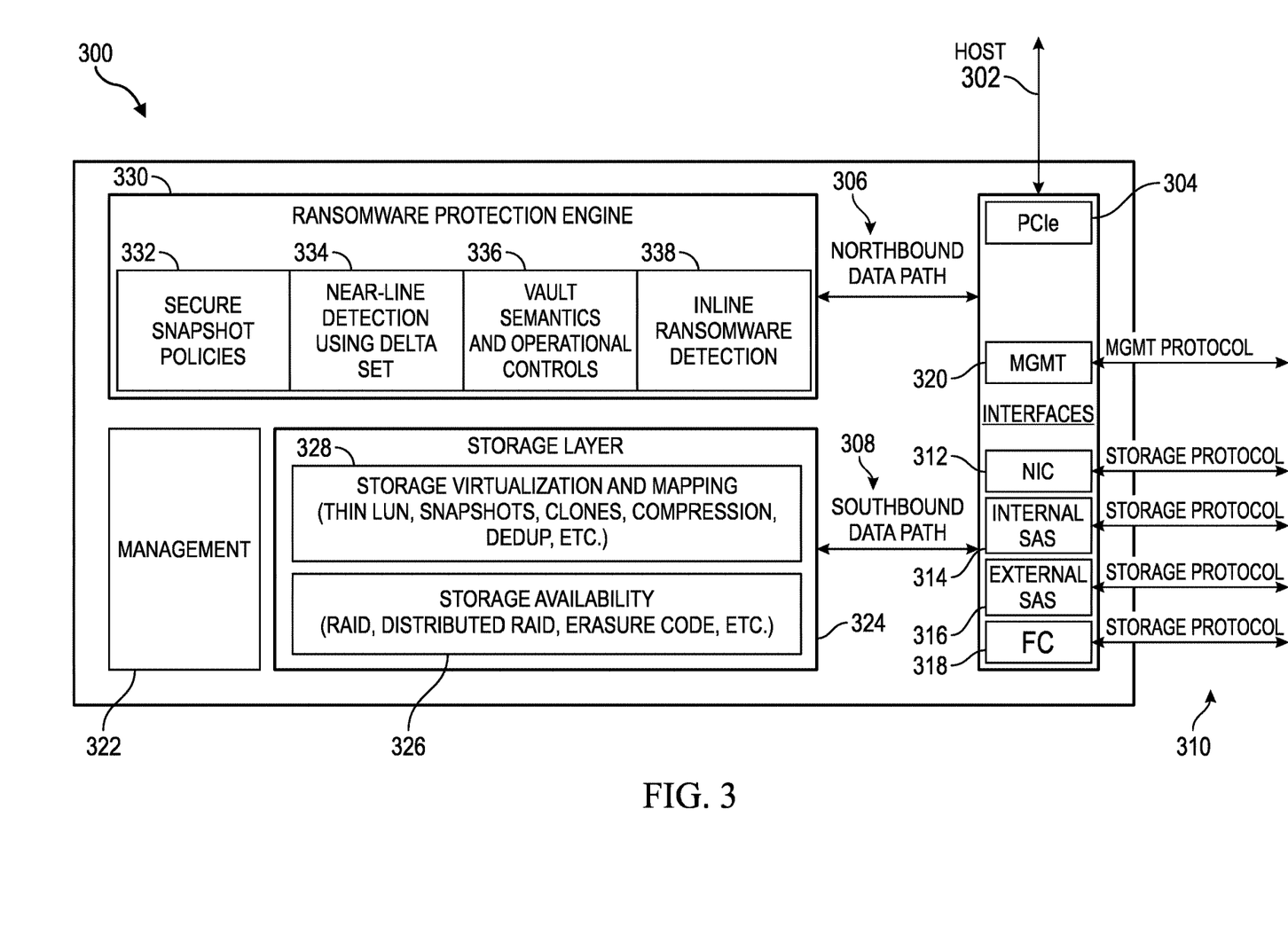
FIG. 3 is a block diagram illustrating an example ransomware protection SmartNIC, which may be employed in the present systems and methods for protecting IHS boot, according to some embodiments.

FIG. 3 is a block diagram illustrating ransomware protection SmartNIC 300, described below as implemented in accordance with embodiments of the present systems and methods for protecting IHS boot, according to some embodiments. IN SmartNIC 300, as typical of a SmartNIC, a host sees, via 302, storage objects through PCIe bus 304. Data traveling between the server (host) and the SmartNIC goes through this interface, also referred to herein as northbound data path 306. To provide storage function, SmartNIC also has southbound data path(s) 308 to storage devices such, as solid-state drives. Multiple southbound storage protocols 310 may be supported, via SmartNIC 300 such as network storage through a (conventional) NIC 312, Direct Attached Storage (DAS) through internal SAS interface 314, SAS attached JBOD (185) through external SAS interface 316, or even high-performance storage interfaces such as Fiber Channel (FC) 318 or InfiniBand. In some cases, a combination of interfaces may be used. For instance, distributed backend storage may go through NIC 312 for peer traffic and another interface to storage, such as internal SAS interface 314. Management interface 320 has a separate identity and access to management configuration 322 to provide a SmartNIC security domain in accordance with embodiments of the present systems and methods.

Storage layer 324 provides more-or-less traditional storage availability 326 and storage virtualization and mapping 328 functions. Storage availability 326 may be provided via, traditional RAID, distributed RAID, erasure code, etc. With respect to embodiments of the present systems and methods, storage virtualization and mapping 328 may enable a primary function for not only ransomware protection, but also, IHS boot protection in accordance with embodiments of the present systems and methods. For example, storage virtualization and mapping 328 may provide a channel for taking not only more- or less conventional snapshots of data objects, but also, secure snapshots of data objects and, in accordance with embodiments of the present systems and methods, secure snapshots of an IHS boot device while it is in a known good state. In addition, other storage virtualization such as (thin) Logical Unit Number (LUN)) provisioned storage objects, clones, compression, deduplication, etc. are all more-or-less traditional advantageous features to have in a storage SmartNIC.

Ransomware protection engine 330, implemented in accordance with embodiments of the present systems and methods on top of storage layer 324, is made up of secure snapshot policies 332, near-line detection 334 using delta set of the data, vault semantics and operational controls 336, and inline ransomware detection 338.

Secure snapshot policy engine 332 implements secure snapshots, which are each a point in time image of the IHS boot device while it is in a known good state, in accordance with embodiments of the present systems and methods for protecting IHS boot. Further, in accordance with embodiments of the present systems and methods, this secure snapshot cannot be deleted until a subsequent (fresh) (good) boot has occurred, of which a new secure snapshot has been taken. In embodiments of the present systems and methods, the purpose of a secure snapshot is to ensure availability of a usable (good) boot device that can be restored in case the current boot device is encrypted or destroyed by a cyberattack. While the snapshot feature is provided by storage virtualization layer 328, the policies of when the secure snapshots are taken are hosted in secure snapshot policy engine module 332. An example of a secure snapshot policy used in accordance with embodiments of the present systems and methods is to create a secure snapshot upon each (good) (re)boot.

Near-line detection 334 uses periodic snapshots to evaluate the probability of a ransomware attack based on a delta change set in consecutive snapshots of data. In the manner described below, embodiments of the present systems and methods for protecting IHS boot may not necessarily need to make use of near-line detection, or other evaluation of the probability, of a ransomware attack, in this manner. However, ransomware attack detection can be based on thresholds of multiple factors, such as, by way of example, significant change of entropy of the data in a given data block, compressibility and deduplicability of the data and/or change of data reduction ratio, etc. and/or based on Machine Learning (ML) algorithms. Near-line detection using snapshot provides a time window to detect ransomware activities with more accuracy. For example, embodiments of the present systems and methods may employ techniques for detecting ransomware attacks that identify a set of suspect blocks written to a data object between first and second points in time (i.e., between snapshots), and in response, secure a state of the data object as of the first point in time, in accordance with embodiments of the present systems and methods.

Although not necessarily used in embodiments of the present systems and methods for protecting IHS boot, vault semantics and operational controls 336 Vault semantics and operational controls 336 ensure that data is locked and isolated from access by an air gap. Updates to the vault is only allowed at specific scheduled time slots. In the context of ransomware protection leveraging SmartNIC 300, these vault operational controls can be applied to the data in the secured domain, as management functions for secure snapshots to implement aspects of the present systems and methods. These operational controls include, but are not limited to, fine grain access control, defining a security officer role, time-based or interface-based management command restrictions, etc.

Inline detection 338 leverages AI and/or ML algorithms to detect ransomware attacks in real-time. In the manner described below, embodiments of the present systems and methods for protecting IHS boot may not necessarily need to make use of inline ransomware attack detection. However, this feature provides the ability to react to cyber-attacks quickly. Upon detection, policies, such as stopping incoming writes, or taking a secure snapshot may be carried out by secure snapshot policy engine 332.

As noted above, embodiments of the present systems and methods protect the IHS operating environment, through systems and methods for leveraging a SmartNIC, such as a ransomware protection SmartNIC (300), to protect IHS boot. As also discussed above, a secure snapshot is a snapshot that cannot be deleted until the retention timer expires. In accordance with embodiments of the present systems and methods, a secured alternate boot device is exposed to the host based on a secure snapshot of the boot device while it is in a known good state. This secure alternate boot device is configured in the UEFI boot order right after the boot device. In a ransomware attack where the boot device is compromised and fails to boot, the alternate boot device will automatically boot. An administrator (a person or an administrative function with proper access (credentials)) will be alerted to this event to take appropriate actions while the server continues to operate fully using the secure alternate boot device. For example, in a case where the boot device is bootable but not functional such as only displaying a ransomware note, the administrator can easily select the secure alternate device as the primary boot device. As noted, embodiments of the present systems and methods utilize secure snapshots, which are immutable, and therefore, safe. In order to make a fully functional boot device, a read/write snapshot is created from the secure snapshot. This way, the boot process, operating system, and applications can proceed as normal. On each reboot, the read/write snapshot is recreated. The result is on each boot, the secured alternate boot device is always in a safe, good known state without any ransomware or files encrypted by the ransomware. Meanwhile, creating a read/write snapshot on top of the secure snapshot allows the OS and applications to function normally without having to deal with a read-only boot device operating environment.

Figure 4:
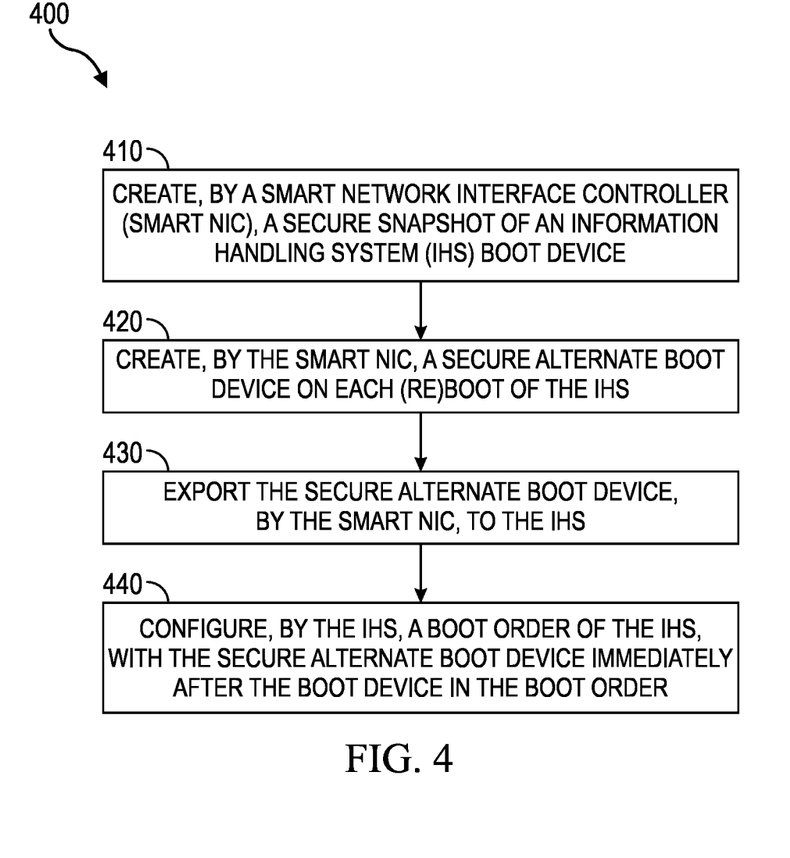
FIG. 4 is a flowchart of an example process for protecting IHS boot with a (ransomware protection) SmartNIC, according to some embodiments.
Figure 5:
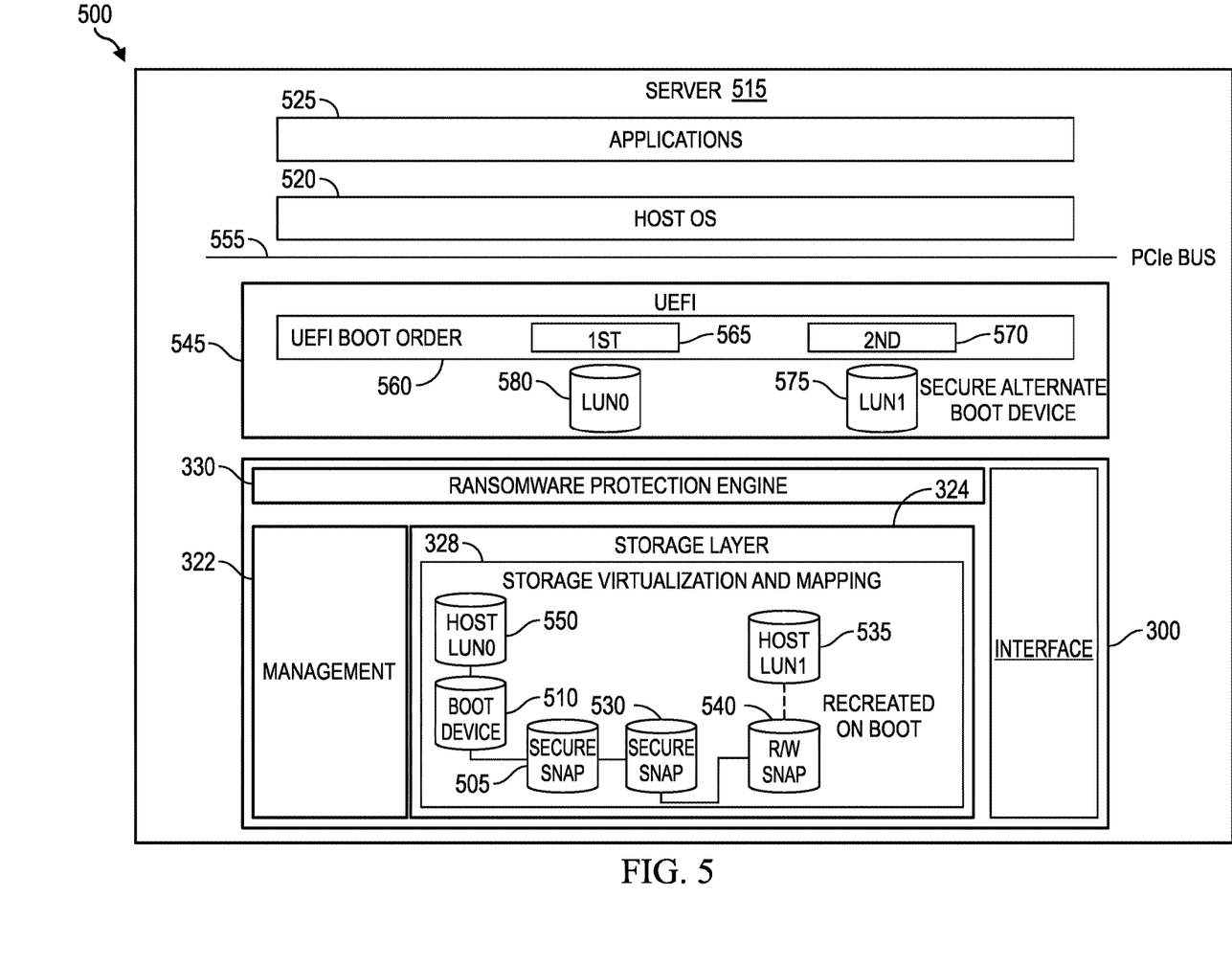
FIG. 5 is a block diagram illustrating an example of protecting IHS boot with a ransomware protection SmartNIC, according to some embodiments.

FIG. 4 is a flowchart of example process 400 for protecting the operating environment of an IHS, such as by, at least in part, protecting IHS boot with a (ransomware protection) SmartNIC, according to some embodiments, and FIG. 5 is a block diagram illustrating implementation 500 for protecting the operating environment of an IHS, such as by, at least in part, protecting IHS boot with a (ransomware protection) SmartNIC (300), according to some embodiments. FIGS. 4 and 5 are described together below. In particular, FIG. 5 shows an abridged version of ransomware protection Smart-NIC 300 of FIG. 3, illustrating (only) the elements of ransomware protection SmartNIC 300 employed in example process 400 for protecting IHS boot in implementation 500.

At 410, boot device secure snapshot 505 is created by (ransomware protection) SmartNIC 300. Specifically, leveraging storage layer 324 storage virtualization and mapping 328 of the ransomware protection SmartNIC, secure snapshot 505 is created from boot device 510 while it is in a known good state. This known good state is defined as a state that the IHS (server 515) can provide a one-hundred percent operating capacity. An example may include having the proper operating system (520) and versions of applications (525) installed. Subsequent updates to boot device 510 such as operating system and application upgrades should trigger the creation of new secure snap 530 to reflect on the changes.

At 420, secure alternate boot device 535 is created on each (re)boot. To such ends, (ransomware protection) SmartNIC 300 automatically creates read and writeable snapshot 540 from secure snapshot 505 (or 530). In operation, the server boot process and runtime proceeds normally reading and writing to boot device 510, and creation and use of read and writeable snapshot 540 on top of secure snapshot 505 allows the IHS OS and applications to function normally without having to deal with a read-only boot device operating environment. On any subsequent boot, read and writeable snapshot 540 is deleted and (re)created to ensure any corrupted or undesirable changes are removed, so as to ensure secure alternate boot device 535 is always a safe and true image of secure snapshot 505 (or 530) at boot time.

At 430 secure alternate boot device 535 is exported to UEFI (BIOS) 545, or the like. That is, (ransomware protection) SmartNIC 300 may export both boot device 510 (as Host LUN0 550) and secure alternate boot device 535 (Host LUN1) on (PCIe) bus 555. The rest of the system including UEFI sees both devices in their discoveries.

At 440, boot order 560 is configured in UEFI (BIOS) 545, or the like. Boot order 560 is a UEFI (BIOS) function, or the like, wherein an administrator (a person or an administrative function with proper access (credentials)) can, typically, configure the order of the devices a server boots from. If server 515 fails to boot from one device (e.g., first device 565), the server moves on to boot from the next device in the boot order (e.g., second device 570). In accordance with embodiments of the present systems and methods, secure alternate boot device 575, UEFI (BIOS) 545 local-stored copy of secure alternate boot device 535 (Host LUN1), is configured immediately after boot device 580, UEFI (BIOS) 545 local-stored copy of boot device 510 (Host LUN0 550), in the boot order (560). In this way, if boot device 580 (510/550) is compromised, server 515 will automatically boot from secure alternate boot device 575 (535/540/505 (or 530)).

Embodiments of the present systems and methods enable protection of a server operating environment using a ransomware protection SmartNIC that has a separate security domain from the server, providing an operator of the server an extra layer of protection and fast recovery from ransomware attacks that involve the server boot device, a robust defense strategy where the server can return to full operating capacity with a reboot even in the presence of a cyber-attack. Additionally, this boot protection is provided in an "out of band" manner, such that an application on the server, or even the server itself, is unaware, and under normal operation, unaffected by the boot protection.

Thusly, not only may ransomware protection leveraging SmartNICs provide effective ransomware protection, with coordinated data protection, ransomware detection in the data path, and intelligent operational controls and policies, by implementing ransomware protection as part of a storage SmartNIC, but also protection of the operating environment of an IHS, such as by, at least in part, though boot protection.

In accordance with the forgoing, a SmartNIC is a particularly well-suited platform for (ransomware) boot protection. On one hand, it has the capability to offload significant computes and resources for not only ransomware detection, but also boot protection. On the other hand, it has a separate security domain from the server, and therefore, provides isolation from cyber-attacks on the server in a cost-effective manner, in a strategic manner, without additional hardware.

It should be understood that various operations described herein may be implemented in software executed by processing circuitry, hardware, or a combination thereof. The order in which each operation of a given method is performed may be changed, and various operations may be added, reordered, combined, omitted, modified, etc. It is intended that the invention(s) described herein embrace all such modifications and changes and, accordingly, the above description should be regarded in an illustrative rather than a restrictive sense.

To implement various operations described herein, computer program code (i.e., instructions for carrying out these operations) may be written in any combination of one or more programming languages, including an object-oriented programming language such as Java, Smalltalk, Python, C++, or the like, conventional procedural programming languages, such as the "C" programming language or similar programming languages, or any of machine learning software. These program instructions may also be stored in a computer readable storage medium that can direct a computer system, other programmable data processing apparatus, controller, or other device to operate in a particular manner, such that the instructions stored in the computer readable medium produce an article of manufacture including instructions which implement the operations specified in the block diagram block or blocks. The program instructions may also be loaded onto a computer, other programmable data processing apparatus, controller, or other device to cause a series of operations to be performed on the computer, or other programmable apparatus or devices, to produce a computer implemented process such that the instructions upon execution provide processes for implementing the operations specified in the block diagram block or blocks.

In various embodiments, aspects of systems and methods described herein may be implemented, at least in part, using machine learning (ML). As used herein, the terms "machine learning" or "ML" refer to one or more algorithms that implement: a neural network (e.g., artificial neural network, deep neural network, convolutional neural network, recurrent neural network, autoencoders, reinforcement learning, etc.), fuzzy logic, artificial intelligence (AI), deep learning, deep structured learning hierarchical learning, support vector machine (SVM) (e.g., linear SVM, nonlinear SVM, SVM regression, etc.), decision tree learning (e.g., classification and regression tree or "CART"), Very Fast Decision Tree (VFDT), ensemble methods (e.g., ensemble learning, Random Forests, Bagging and Pasting, Patches and Subspaces, Boosting, Stacking, etc.), dimensionality reduction (e.g., Projection, Manifold Learning, Principal Components Analysis, etc.), or the like.

Non-limiting examples of publicly available machine learning algorithms, software, and libraries that may be utilized within embodiments of systems and methods described herein include, but are not limited to: PYTHON, OPENCV, INCEPTION, THEANO, TORCH, PYTORCH, PYLEARN2, NUMPY, BLOCKS, TENSORFLOW, MXNET, CAFFE, LASAGNE, KERAS, CHAINER, MATLAB Deep Learning, CNTK, MatConvNet (a MATLAB toolbox implementing convolutional neural networks for computer vision applications), DeepLearnToolbox (a Matlab toolbox for Deep Learning from Rasmus Berg Palm), BigDL, Cuda-Convnet (a fast C++/CUDA implementation of convolutional or feed-forward neural networks), Deep Belief Networks, RNNLM, RNNLIB-RNNLIB, matrbm, deeplearning4j, Eblearn.lsh, deepmat, MShadow, Matplotlib, SciPy, CXXNET, Nengo-Nengo, Eblearn, cudamat, Gnumpy, 3-way factored RBM and mcRBM, mPoT, ConvNet, ELEKTRONN, OpenNN, NEURALDESIGNER, Theano Generalized Hebbian Learning, Apache SINGA, Lightnet, and SimpleDNN."

The terms "tangible" and "non-transitory," as used herein, are intended to describe a computer-readable storage medium (or "memory") excluding propagating electromagnetic signals; but are not intended to otherwise limit the type of physical computer-readable storage device that is encompassed by the phrase computer-readable medium or memory. For instance, the terms "non-transitory computer readable medium" or "tangible memory" are intended to encompass types of storage devices that do not necessarily store information permanently, including, for example, RAM. Program instructions and data stored on a tangible computer-accessible storage medium in non-transitory form may afterwards be transmitted by transmission media or signals such as electrical, electromagnetic, or digital signals, which may be conveyed via a communication medium such as a network and/or a wireless link.

Reference is made herein to "configuring" a device or a device "configured to" perform some operation(s). It should be understood that this may include selecting predefined logic blocks and logically associating them. It may also include programming computer software-based logic of a retrofit control device, wiring discrete hardware components, or a combination of thereof. Such configured devices are physically designed to perform the specified operation(s).

Modules and/or engines implemented in software for execution by various types of processors may, for instance, include one or more physical or logical blocks of computer instructions, which may, for instance, be organized as an object or procedure. Nevertheless, the executables of an identified module and/or engine need not be physically located together but may include disparate instructions stored in different locations which, when joined logically together, include the module and/or engine and achieve the stated purpose for the module and/or engine. Indeed, a module and/or engine of executable code may be a single instruction, or many instructions, and may even be distributed over several different code segments, among different programs, and across several memory devices. Similarly, operational data may be identified and illustrated herein within modules and/or engines and may be embodied in any suitable form and organized within any suitable type of data structure. The operational data may be collected as a single data set or may be distributed over different locations including over different storage devices.

Unless stated otherwise, terms such as "first" and "second" are used to arbitrarily distinguish between the elements such terms describe. Thus, these terms are not necessarily intended to indicate temporal or other prioritization of such elements. The terms "coupled" or "operably coupled" are defined as connected, although not necessarily directly, and not necessarily mechanically. The terms "a" and "an" are defined as one or more unless stated otherwise. The terms "comprise" (and any form of comprise, such as "comprises" and "comprising"), "have" (and any form of have, such as "has" and "having"), "include" (and any form of include, such as "includes" and "including") and "contain" (and any form of contain, such as "contains" and "containing") are open-ended linking verbs. As a result, a system, device, or apparatus that "comprises," "has," "includes" or "contains" one or more elements possesses those one or more elements but is not limited to possessing only those one or more elements. Similarly, a method or process that "comprises," "has," "includes" or "contains" one or more operations possesses those one or more operations but is not limited to possessing only those one or more operations.

Although the invention(s) is/are described herein with reference to specific embodiments, various modifications and changes can be made without departing from the scope of the present invention(s), as set forth in the claims below. Accordingly, the specification and figures are to be regarded in an illustrative rather than a restrictive sense, and all such modifications are intended to be included within the scope of the present invention(s). Any benefits, advantages, or solutions to problems that are described herein with regard to specific embodiments are not intended to be construed as a critical, required, or essential feature or element of any or all the claims.

The invention claimed is:

1. A method for protecting boot of an information handling system using a smart network interface controller, the method comprising:
   in response to detecting a change in data stored to a predetermined block of a boot device of the information handling system, wherein the change is detected as a function of data stored to the boot device at a first point in time and a second point in time, and wherein the second point in time is between successful boots of the information handling system, creating, by a smart network interface controller, a secure snapshot of the information handling system boot device, wherein the secure snapshot is created based at least in part on the data stored to the boot device at the first point in time;
   creating, by the smart network interface controller, a secure alternate boot device on each boot of the information handling system;
   exporting the secure alternate boot device, by the smart network interface controller, to the information handling system; and
   configuring, by the information handling system, a boot order of the information handling system, with the secure alternate boot device immediately after a first boot device in the boot order, wherein the boot order is configured in a Unified Extensible Firmware Interface (UEFI).

2. The method of claim 1, wherein creating the secure alternate boot device on each boot of the information handling system comprises the smart network interface controller creating a read and writeable snapshot from the secure snapshot of the information handling system boot device.

3. The method of claim 2, further comprising:
   deleting, on each subsequent boot of the information handling system, the read and writeable snapshot for a prior boot; and
   creating a new read and writeable snapshot from the secure snapshot of the information handling system boot device from the subsequent boot of the information handling system.

4. The method of claim 1, wherein creating the secure snapshot of the boot device further comprises using a storage virtualization and mapping of the smart network interface controller, to create the secure snapshot of the boot device while the boot device is in a known good state.

5. The method of claim 1, wherein the smart network interface controller is a ransomware protection smart network interface controller.

6. The method of claim 5, wherein creating a boot device secure snapshot further comprises using a storage virtualization and mapping of the ransomware protection smart network interface controller to create the secure snapshot of the boot device while the boot device is in a known good state.

7. The method of claim 1, further comprising triggering, by a subsequent upgrade or update to the boot device, creation of a new secure snapshot of the boot device.

8. The method of claim 1, further comprising exporting, by the smart network interface controller, the boot device, with the secure alternate boot device, to the information handling system.

9. The method of claim 8, further comprising discovering, by the information handling system, both the boot device and the secure alternate boot device.

10. The method of claim 1, wherein, in response to the information handling system failing to boot from the boot device, the information handling system booting from the secure alternate boot device.

11. An information handling system comprising:
    an information handling system server; and
    a smart network interface controller configured to:
       in response to a change in entropy detected as a function of data stored at a first point in time to a boot device, the change in entropy relative to data stored to the boot device at a later second point in time between successful boots of the information handling system server, create a secure snapshot of the boot device based at least in part on the data stored at the first point in time;
       create a secure alternate boot device on each boot of the information handling system server; and
       export the boot device and the secure alternate boot device to the information handling system server; and
    the information handling system server configured to set a boot order of the information handling system server, with the secure alternate boot device immediately after a first boot device in the boot order, wherein the boot order is configured in a Unified Extensible Firmware Interface (UEFI).

12. The information handling system of claim 11, wherein the information handling system server is disposed in a server chassis and the smart network interface controller is disposed in the same, or another server chassis, operatively coupled to the information handling system server.

13. The information handling system of claim 11, wherein the smart network interface controller is further configured to create a read and writeable snapshot from the secure snapshot of the information handling system server boot device.

14. The information handling system of claim 13, wherein the smart network interface controller is further configured to:
- delete, on each subsequent boot of the information handling system server, the read and writeable snapshot for the prior boot; and
- create a new read and writeable snapshot from a secure snapshot of the information handling system server boot device from the subsequent boot of the information handling system.

15. The information handling system of claim 11, wherein the smart network interface controller is a ransomware protection smart network interface controller and further comprises storage virtualization and mapping, and the ransomware protection smart network interface controller is further configured to create the secure snapshot of the boot device, using the ransomware protection smart network interface controller storage virtualization and mapping, while the boot device is in a known good state.

16. The information handling system of claim 11, wherein the smart network interface controller is further configured to trigger, by a subsequent upgrade or update to the boot device, creation of a new secure snapshot of the boot device.

17. The information handling system of claim 11, wherein the information handling system server is further configured to discover both the boot device and the secure alternate boot device.

18. The information handling system of claim 11, wherein the information handling system server is further configured to boot from the secure alternate boot device, in response to the information handling system server failing to boot from the boot device.

19. A non-transitory computer readable medium having program instructions stored thereon, which upon execution by a smart network interface controller and an information handling system, cause the smart network interface controller information handling system to:
- in response to detecting a change in data stored to a predetermined block of a boot device of the information handling system, wherein the change is detected as a function of data stored to the boot device at a first point in time and a second point in time, and wherein the second point in time is between successful boots of the information handling system:
- stop incoming writes to the boot device and create a secure snapshot of the boot device, wherein the secure snapshot is created based at least in part on the data stored to the boot device at the first point in time;
- create a secure alternate boot device based on the secure snapshot;
- export the boot device and the secure alternate boot device to the information handling system; and
- cause the information handling system to set a boot order of the information handling system, with the secure alternate boot device immediately after a first boot device in the boot order, wherein the boot order is configured in a Unified Extensible Firmware Interface (UEFI).

20. The non-transitory computer readable medium of claim 19, wherein upon execution by a smart network interface controller, the program instructions further cause the smart network interface controller information handling system to:
- create a read and writeable snapshot from the secure snapshot of the information handling system boot device;
- delete, on each subsequent boot of the information handling system, the read and writeable snapshot for the prior boot; and
- create a new read and writeable snapshot from a secure snapshot of the information handling system boot device from the subsequent boot of the information handling system.

* * * * *